United States Patent
Lu et al.

(10) Patent No.: US 10,451,947 B1
(45) Date of Patent: Oct. 22, 2019

(54) APOCHROMATIC PANCHARATNAM BERRY PHASE (PBP) LIQUID CRYSTAL STRUCTURES FOR HEAD-MOUNTED DISPLAYS

(71) Applicant: Facebook Technologies, LLC, Menlo Park, CA (US)

(72) Inventors: Lu Lu, Seattle, WA (US); Wai Sze Tiffany Lam, Redmond, WA (US); Scott Charles McEldowney, Redmond, WA (US); Pasi Saarikko, Kirkland, WA (US)

(73) Assignee: Facebook Technologies, LLC, Menlo Park, CA (US)

( * ) Notice: Subject to any disclaimer, the term of this patent is extended or adjusted under 35 U.S.C. 154(b) by 131 days.

(21) Appl. No.: 15/798,178

(22) Filed: Oct. 30, 2017

Related U.S. Application Data

(60) Provisional application No. 62/415,444, filed on Oct. 31, 2016.

(51) Int. Cl.
| | | |
|---|---|---|
| *G02F 1/29* | (2006.01) | |
| *G02F 1/139* | (2006.01) | |
| *G02F 1/1347* | (2006.01) | |
| *G06F 1/16* | (2006.01) | |

(52) U.S. Cl.
CPC ........ *G02F 1/1393* (2013.01); *G02F 1/13471* (2013.01); *G02F 1/292* (2013.01); *G06F 1/163* (2013.01); *G02F 2001/294* (2013.01); *G02F 2203/05* (2013.01)

(58) Field of Classification Search
CPC .... G02F 1/292; G02F 1/137; G02F 2201/307; G02F 2001/13706; G02F 2203/62; G02B 27/0172; G02B 2027/0116; G02C 7/083
See application file for complete search history.

(56) References Cited

U.S. PATENT DOCUMENTS

| | | | | |
|---|---|---|---|---|
| 2018/0129018 | A1* | 5/2018 | Cheng | G02B 5/3008 |
| 2018/0284464 | A1* | 10/2018 | Lu | G02B 27/14 |
| 2019/0075281 | A1* | 3/2019 | Hall | G02F 1/1393 |
| 2019/0123831 | A1* | 4/2019 | Gaubatz | G02B 6/126 |

* cited by examiner

*Primary Examiner* — Hoan C Nguyen
(74) *Attorney, Agent, or Firm* — Fenwick & West LLP

(57) ABSTRACT

A Pancharatnam Berry Phase (PBP) liquid crystal structure for adjusting or focusing light of a plurality of color channels emitted by a display of a head-mounted display (HMD) comprises a plurality of PBP active elements. Each PBP active element of the structure is configured to act as a half waveplate for light of a corresponding color channel, such that light of the corresponding color channel is adjusted by a predetermined amount. In addition, each PBP active element acts as a one waveplate for light of the remaining color channels, such that light of the remaining color channels passes through the PBP active element substantially unaffected. As such, the PBP structure is able to adjust incident light of the plurality of color channels uniformly in an apochromatic fashion.

20 Claims, 10 Drawing Sheets

$$\Theta_{Red} = \Theta_{Green} * \frac{\lambda_{Green}}{\lambda_{Red}}$$

$$2\Theta \approx r^2/f * (\pi/\lambda) \implies \Theta_{Green} \approx \frac{r^2}{2f} * \frac{\pi}{\lambda_{Green}}$$

$$\Theta_{Blue} = \Theta_{Green} * \frac{\lambda_{Green}}{\lambda_{Blue}}$$

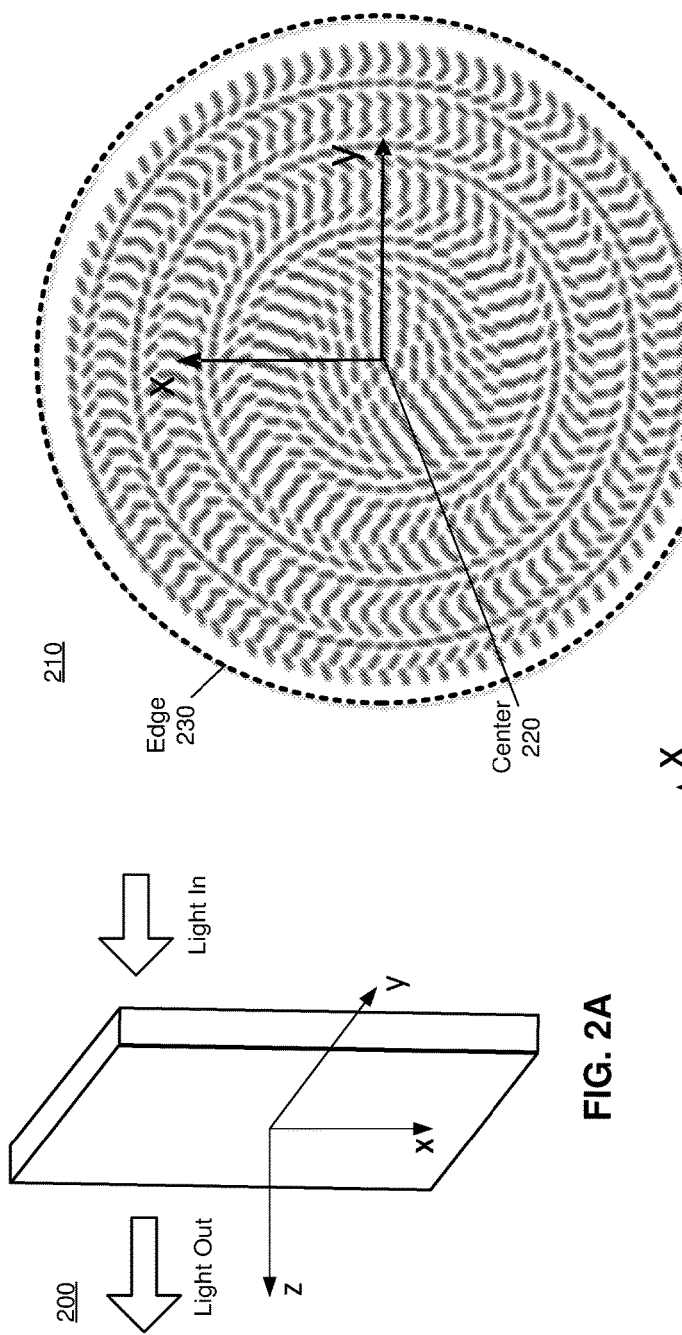
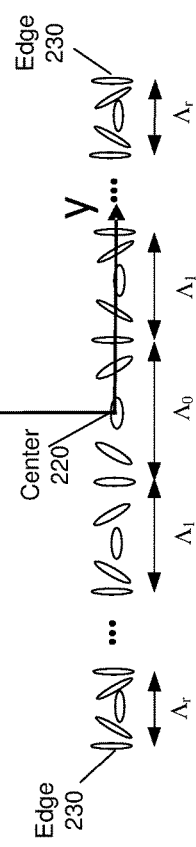
FIG. 2A
FIG. 2B
FIG. 2C

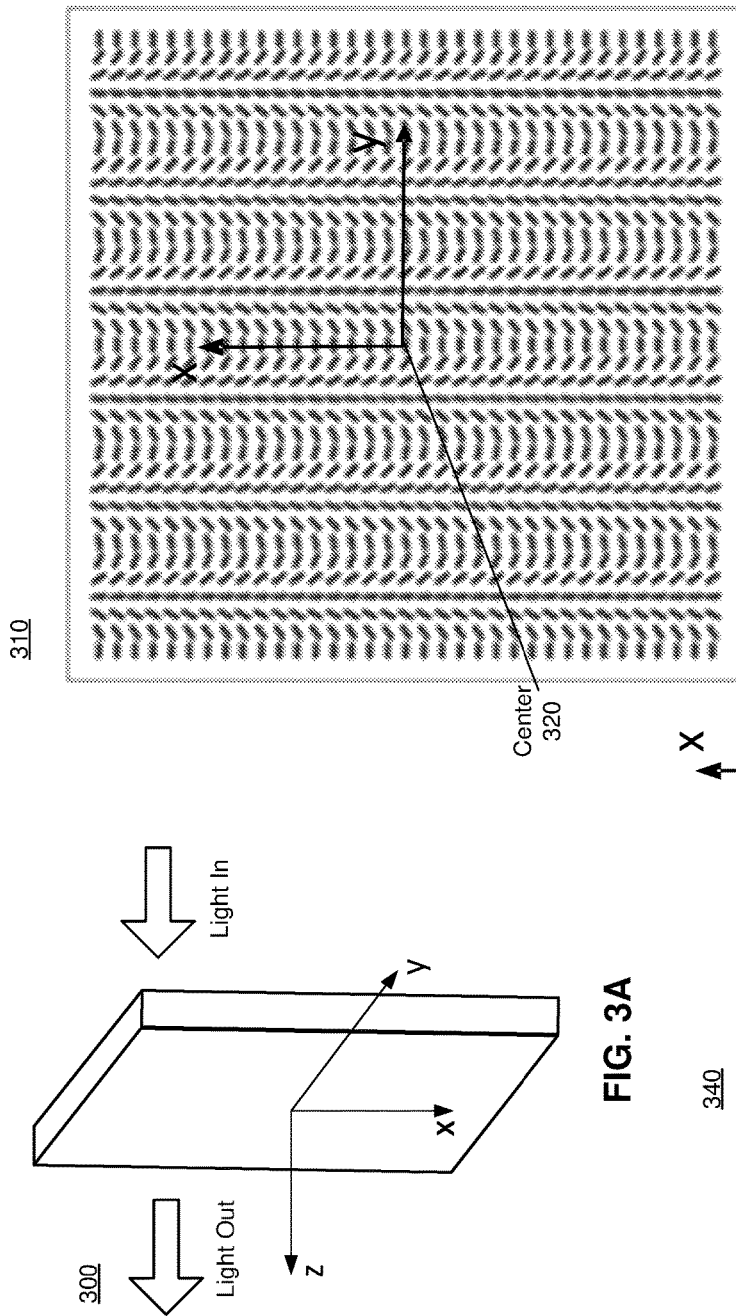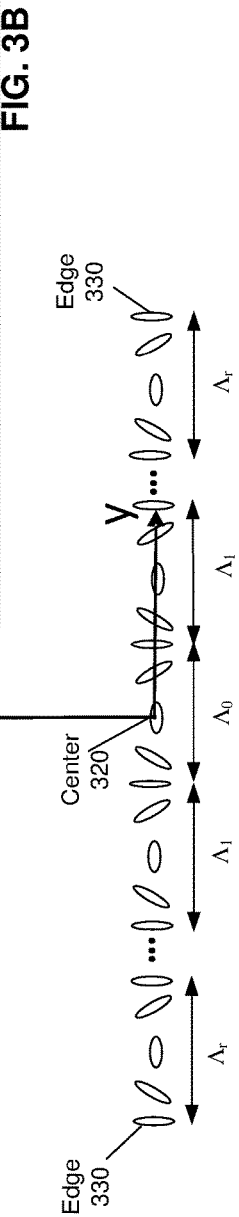
FIG. 3A
FIG. 3B
FIG. 3C

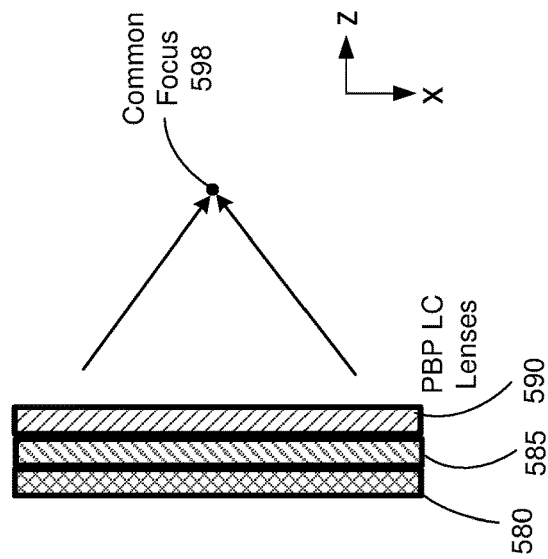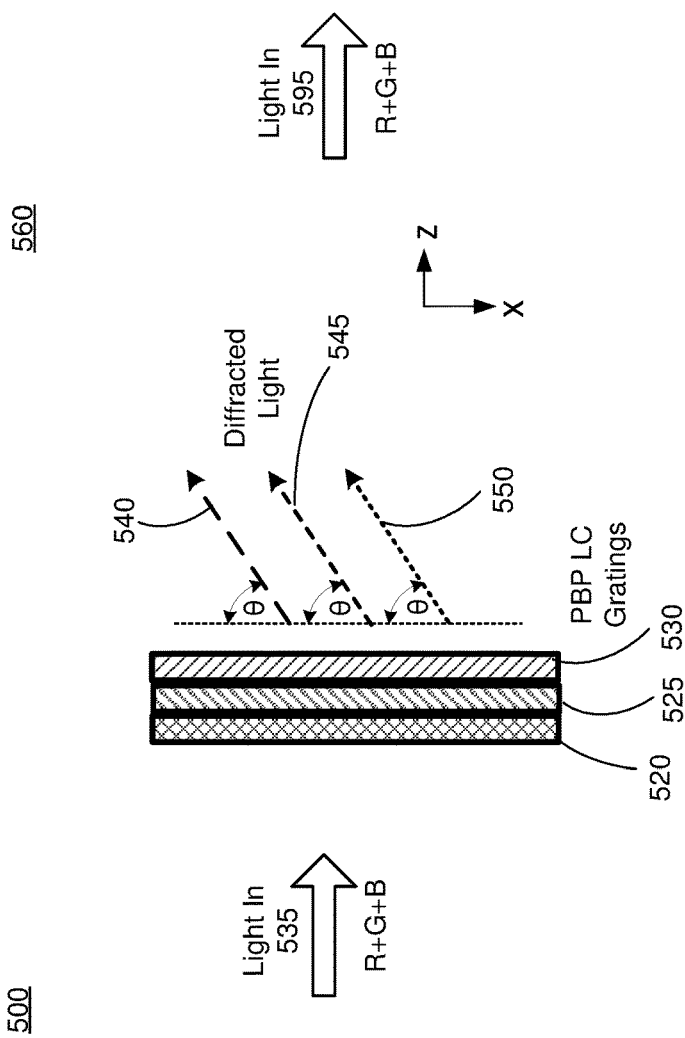

APOCHROMATIC PANCHARATNAM BERRY PHASE (PBP) LIQUID CRYSTAL STRUCTURES FOR HEAD-MOUNTED DISPLAYS

CROSS REFERENCE TO RELATED APPLICATIONS

This application claims the benefit of U.S. Provisional Application No. 62/415,444, filed Oct. 31, 2016, which is incorporated by reference in its entirety.

BACKGROUND

The present disclosure generally relates to design of optical assemblies, and specifically relates to chromatic error correction of Pancharatnam Berry Phase (PBP) liquid crystal structures for optical assemblies that may be used in virtual reality (VR), augmented reality (VR), and mixed reality (MR) systems.

PBP liquid crystal components can be used as an integral part of an optical assembly in a head-mounted display (HMD) that may be part of, e.g., a VR system, an AR system, a MR system, or some combination thereof. The PBP liquid crystal components can be implemented as PBP liquid crystal gratings and/or PBP liquid crystal lenses. However, both types of PBP components have strong wavelength dependencies on optical performance, wherein the diffraction angle or the focus distance of the PBP component varies based upon the wavelength of light. This reduces image quality in imaging systems that employ an optical assembly with PBP liquid crystal components and a light source that emits light of multiple wavelengths or color channels.

BRIEF DESCRIPTION OF THE DRAWINGS

FIG. 2A illustrates an example of a PBP liquid crystal (LC) lens, in accordance with some embodiments.

FIG. 2B illustrates an example of liquid crystal orientations in the PBP LC lens of FIG. 2A, in accordance with some embodiments.

FIG. 2C illustrates a section of liquid crystal orientations taken along a y axis in the PBP LC lens of FIG. 2A, in accordance with some embodiments.

FIG. 3A illustrates an example of a PBP LC grating, in accordance with some embodiments.

FIG. 3B illustrates an example of liquid crystal orientations in the PBP LC grating of FIG. 3A, in accordance with some embodiments.

FIG. 3C illustrates a section of liquid crystal orientations taken along a y axis in the PBP LC grating of FIG. 3A, in accordance with some embodiments.

FIG. 5A illustrates an apochromatic PBP LC grating structure, in accordance with some embodiments.

FIG. 5B illustrates an apochromatic PBP LC lens structure, in accordance with some embodiments.

Figure 1A:
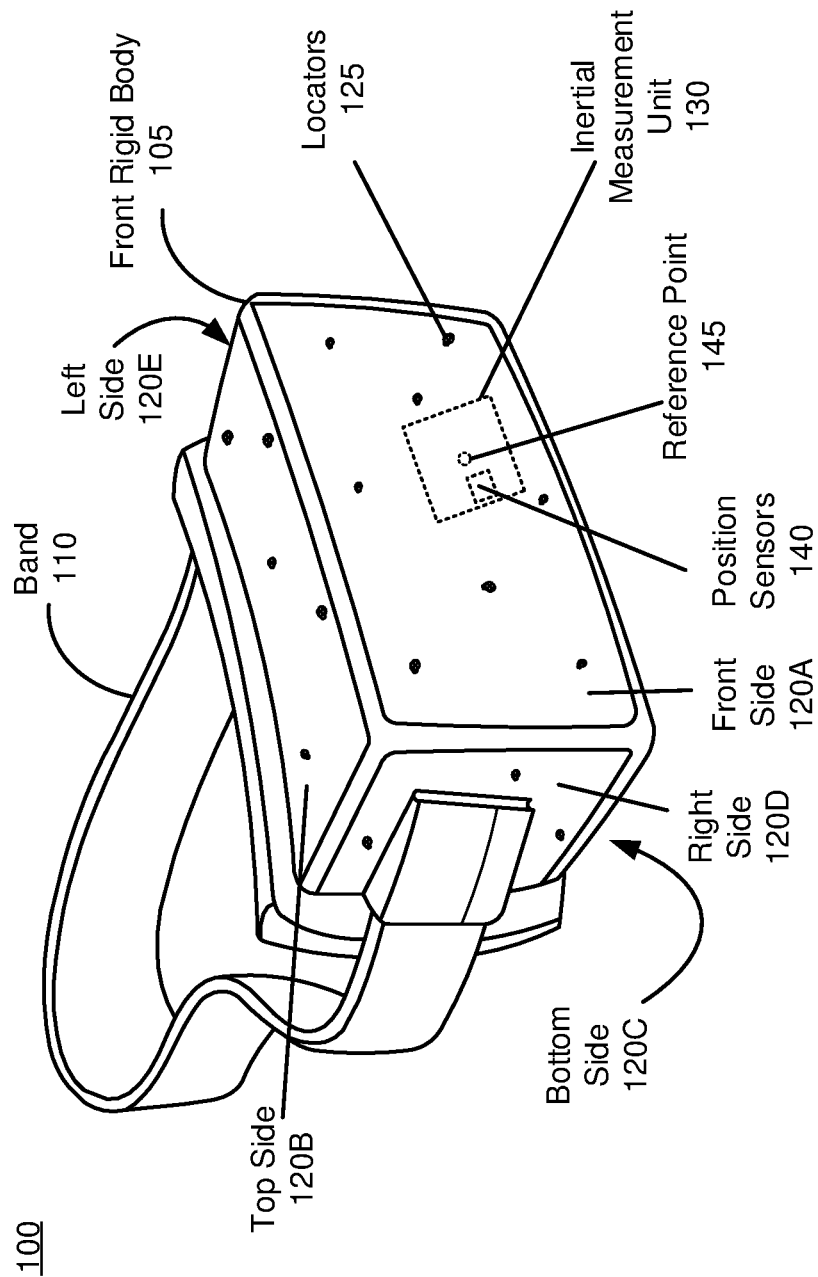
FIG. 1A is a diagram of a head-mounted display (HMD), in accordance with an embodiment.

The figures depict embodiments of the present disclosure for purposes of illustration only. One skilled in the art will readily recognize from the following description that alternative embodiments of the structures and methods illustrated herein may be employed without departing from the principles, or benefits touted, of the disclosure described herein.

SUMMARY

A PBP structure is configured to adjust or focus light as part of an optical assembly in an HMD. The PBP structure comprises one or more PBP plates, one or more PBP active elements, or some combination thereof. Each PBP plate or active element may be a PBP LC grating or a PBP LC lens, and corresponds to a wavelength range associated with a particular color channel of a set of color channels.

The PBP plates of the PBP structure may comprise at least a first PBP plate and a second PBP plate. The first PBP plate is configured to act as half waveplate for light of a first wavelength range corresponding to a first color channel of a set of color channels, such that light of the first wavelength range is adjusted by a first amount, and to act as a one waveplate for at least light of a second wavelength range corresponding to a second color channel of the set of color channels, such that light of the second wavelength range is able to pass through the first PBP plate without substantially changing direction. The second PBP plate is configured to act as a half waveplate for light of the second wavelength range, such that light of the second wavelength range is adjusted by the first amount, and to act as a one waveplate for a least light of the first wavelength range, such that light of the first wavelength range is able to pass through the second PBP plate without substantially changing direction.

In some embodiments, the PBP structure comprises a PBP plate corresponding to each color channel of the set of color channel. Each PBP plate is configured to act as a half waveplate for its respective color channel such that light of the respective color channel is adjusted by the PBP plate by a set amount. In addition, each PBP plate acts as a one waveplate for the remaining color channels of the set of color channels. As such, light from each color channel passing through the PBP structure is adjusted by the same amount (e.g., by its corresponding PBP plate, while passing through the remaining PBP plates substantially unadjusted).

DETAILED DESCRIPTION

Configuration Overview

One or more embodiments disclosed herein relate to the apochromatic design of a (Pancharatnam Berry Phase) PBP structure comprising a plurality of PBP plates. A PBP plate may be made using active liquid crystal or a liquid crystal polymer with photoalignment technology. PBP plates can achieve multiple or varying focal lengths when designed as a lens, or multiple steering angles when designed as a steering plate (also referred to as a grating). In some embodiments, the PBP plate may be used for static or active operation of a display device.

In some embodiments, a series of PBP plates each associated with a different color channel are coupled together to form a PBP structure, such as an apochromatic grating structure or an apochromatic lens structure. The grating structure is composed of a series of PBP liquid crystal gratings that are each configured to operate as a half waveplate for a respective color channel, while operating as a one waveplate (no change) for the other color channels. Each of the PBP LC gratings is configured such that light within their respective color channel is diffracted to a common angle.

The lens structure is composed of a series of PBP liquid crystal lenses that are each configured to operate as a half waveplate for a respective color channel, and operate as a one waveplate for the remaining color channels. Each of the PBP LC lenses is configured such that light within their respective color channel is focused to a common point. The color corrected structures may be used in, e.g., an optical element in a head-mounted display. This is useful to deal with vergence—accommodation conflict in artificial reality environments.

Embodiments of the invention may include or be implemented in conjunction with an artificial reality system. Artificial reality is a form of reality that has been adjusted in some manner before presentation to a user, which may include, e.g., a virtual reality (VR), an augmented reality (AR), a mixed reality (MR), a hybrid reality, or some combination and/or derivatives thereof. Artificial reality content may include completely generated content or generated content combined with captured (e.g., real-world) content. The artificial reality content may include video, audio, haptic feedback, or some combination thereof, and any of which may be presented in a single channel or in multiple channels (such as stereo video that produces a three-dimensional effect to the viewer). Additionally, in some embodiments, artificial reality may also be associated with applications, products, accessories, services, or some combination thereof, that are used to, e.g., create content in an artificial reality and/or are otherwise used in (e.g., perform activities in) an artificial reality. The artificial reality system that provides the artificial reality content may be implemented on various platforms, including a head-mounted display (HMD) connected to a host computer system, a standalone HMD, a mobile device or computing system, or any other hardware platform capable of providing artificial reality content to one or more viewers.

Head Mounted Display (HMD)

FIG. 1A is a diagram of a head-mounted display (HMD), in accordance with an embodiment. The HMD may be used as part of an artificial reality system. As illustrated in FIG. 1A, the HMD 100 includes a front rigid body 105 and a band 110. The front rigid body 105 is configured to be situated in front of a user's eyes, and the band 110 is configured to be stretched and to secure the front rigid body 105 on the user's head.

In some embodiments, the front rigid body 105 comprises an apparatus on which an image is presented to a user. In the embodiment shown in FIG. 1A, the front rigid body 105 includes a front side 120A, a top side 120B, a bottom side 120C, a right side 120D, and a left side 120E. The electronic display is placed near the front rigid body 105. The remaining sides (e.g., the top side 120B, bottom side 120C, right side 120D, and left side 120E) ensure enough distance between the electronic display and eyes of the user for proper presentation of the image. In some embodiments, the sides 120 of the front rigid body 105 are opaque, such that a user wearing the HMD 100 cannot see outside of the HMD 100. In another embodiment, one or more of the sides 120 may be transparent.

In some embodiments, the front rigid body 105 further includes locators 125, an IMU 130, and position sensors 140 for tracking a movement of the HMD 100. The IMU 130 generates, based on motions detected by the position sensors 140, IMU data which can be analyzed to determine the position of the HMD 100. The locators 125 on various parts of the HMD 100 are traced by the imaging device at which slow calibration data is generated for the VR console 110 to identify the position of the HMD 100.

In some embodiments, the IMU 130 is located on the front rigid body 105 for generating the IMU data responsive to the motion of the HMD 100 detected through the position sensors 140. In one aspect, the IMU 130 is placed on the front side 120A of the front rigid body 105. Alternatively, the IMU 130 is located on any surface of the 120A of the front rigid body 105. In the embodiment illustrated in FIG. 1A, the IMU 130 includes the position sensors 140. In other embodiments, the positions sensors 125 may not be included in the IMU 130, and may be placed on any side 120 of the HMD 100.

The locators 125 are located in fixed positions on the front rigid body 105 relative to one another and relative to a reference point 145. In the example of FIG. 1A, the reference point 145 is located at the center of the IMU 130. Locators 125, or portions of the locators 125, are located on a front side 120A, a top side 120B, a bottom side 120C, a right side 120D, and a left side 120E of the front rigid body 105 in the example of FIG. 1A.

Figure 1B:
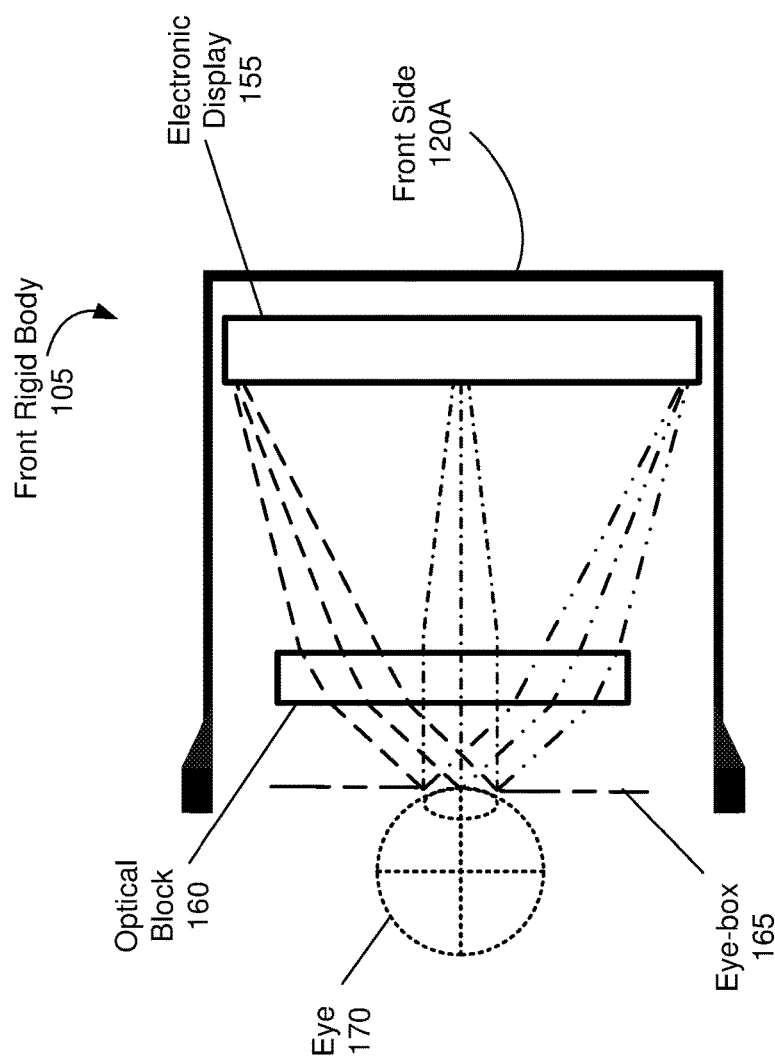
FIG. 1B is a cross section of a front rigid body of the HMD in FIG. 1A, in accordance with an embodiment.

FIG. 1B is a cross section of the front rigid body 105 of the embodiment of the HMD 100 shown in FIG. 1A. As shown in FIG. 1B, the front rigid body 105 includes an electronic display 155 placed near the front side 120A of the front rigid body 105 facing an eye-box 165, and transmits light toward the optical block 160. The eye-box 165 is the location of the front rigid body 105 where a user's eye 170 is positioned. Hence, light generated from the electronic display 155 propagates to the exit pupil 165 through the optical block 160, for example.

For purposes of illustration, FIG. 1B shows a cross section 150 associated with a single eye 170, but another optical block 160, separate from the optical block 160, provides altered image light to another eye of the user. Additionally, the HMD 100 may include an eye tracking system (not shown). The eye tracking system may include, e.g., one or more sources that illuminate one or both eyes of the user, and one or more cameras that captures images of one or both eyes of the user.

The electronic display 155 displays images to the user. In various embodiments, the electronic display 155 may comprise a single electronic display or multiple electronic displays (e.g., a display for each eye of a user). Examples of the electronic display 155 include: a liquid crystal display (LCD), an organic light emitting diode (OLED) display, an inorganic light emitting diode (ILED) display, an active-matrix organic light-emitting diode (AMOLED) display, a transparent organic light emitting diode (TOLED) display, some other display, a projector, or some combination thereof.

The optical block 160 is a component that alters light received from the electronic display 155 and directs the altered light to the exit pupil 165. The optics blocks 160 may include a beam steering plate, a geometric phase lens, or some combination thereof. Both the beam steering plate and the geometric phase lens may correspond to a PBP structure having a stack of PBP plates, and are described in greater detail below. Together, these components of the optical block 160 direct the image light to the exit pupil 165 for presentation to the user. In some embodiments, the image light directed to the user may be magnified, and in some embodiments, also corrected for one or more additional optical errors (e.g., spherical aberration, coma, astigmatism, field curvature, distortion are third order aberrations, etc.) through the optical block 160.

In some embodiments, where the HMD 100 is part of an AR or MR application, the optical block 160 may further receive and alter light from a local area surrounding the HMD 100. For example, light within the environment (hereinafter referred to as "external light") may enter the HMD 100 (e.g., through the front side 120A) to be received by the optical block 160. In some embodiments, the external light passes through the electronic display 155 before being received by the optical block 160. In some embodiments, one or more correction lenses (not shown) or other optical elements may be used to correct one or more distortions experienced by the external light prior to receipt by the optical block 160. For example, a correction lens may be located between the front side 120A and the electronic display 155, and configured to distort incoming external light by an amount to counteract an amount of distortion experienced by the external light when passing through the electronic display.

Figure 1C:
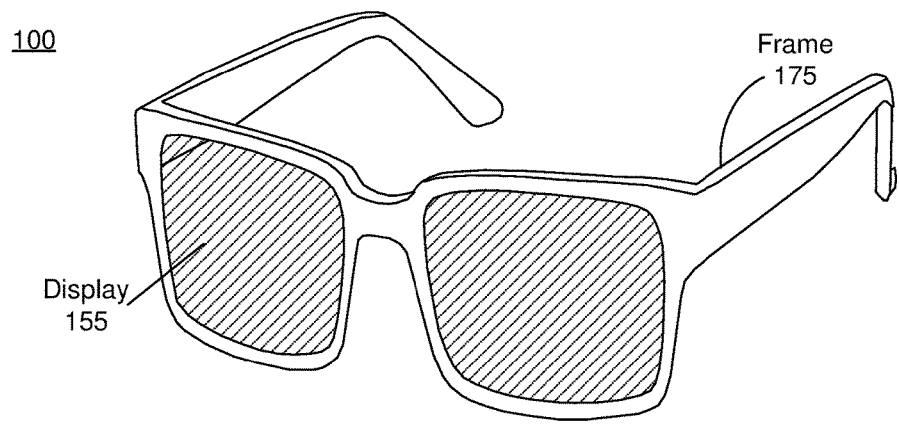
FIG. 1C shows a diagram of an HMD implemented as a near eye display, in accordance with an embodiment.

FIG. 1C shows a diagram of the HMD 100 implemented as a near eye display, in accordance with an embodiment. In this embodiment, the HMD 100 is in the form of a pair of augmented reality glasses. The HMD 100 presents computer-generated media to a user and augments views of a physical, real-world environment with the computer-generated media. Examples of computer-generated media presented by the HMD 100 include one or more images, video, audio, or some combination thereof. In some embodiments, audio is presented via an external device (e.g. speakers and headphones) that receives audio information from the HMD 100, a console (not shown), or both, and presents audio data based on audio information. In some embodiments, the HMD 100 may be modified to also operate as a virtual reality (VR) HMD, a mixed reality (MR) HMD, or some combination thereof. The HMD 100 includes a frame 175 and a display 155. In this embodiment, the frame 175 mounts the near eye display to the user's head, while the display 155 provides image light to the user. The display 155 may be customized to a variety of shapes and sizes to conform to different styles of eyeglass frames.

Figure 1D:
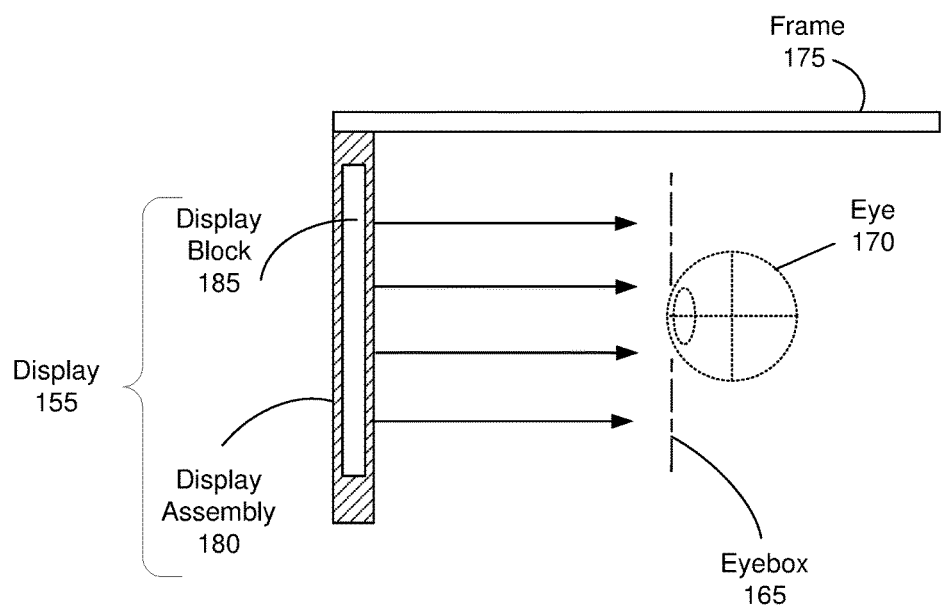
FIG. 1D shows a cross-section view of the HMD implemented as a near eye display.

FIG. 1D shows a cross-section view of the HMD 100 implemented as a near eye display. This view includes the frame 175, the display 155 (which comprises a display assembly 180 and a display block 185), and the eye 170. The display assembly 180 supplies image light to the eye 170. The display assembly 180 houses the display block 185, which, in different embodiments, encloses the different types of imaging optics and redirection structures. For purposes of illustration, FIG. 1D shows the cross section associated with a single display block 185 and a single eye 170, but in alternative embodiments not shown, another display block which is separate from the display block 185 shown in FIG. 1D, provides image light to another eye of the user.

The display block 185, as illustrated below in FIG. 1D, is configured to combine light from a local area with light from computer generated image to form an augmented scene. The display block 185 is also configured to provide the augmented scene to the eyebox 165 corresponding to a location of a user's eye 170. The display block 185 may include, e.g., a waveguide display, a focusing assembly, a compensation assembly, or some combination thereof.

The HMD 100 may include one or more other optical elements between the display block 185 and the eye 150. The optical elements may act to, e.g., correct aberrations in image light emitted from the display block 185, magnify image light emitted from the display block 185, some other optical adjustment of image light emitted from the display block 185, or some combination thereof. The example for optical elements may include an aperture, a Fresnel lens, a convex lens, a concave lens, a filter, or any other suitable optical element that affects image light. The display block 185 may be composed of one or more materials (e.g., plastic, glass, etc.) with one or more refractive indices that effectively minimize the weight and widen a field of view of the HMD 100. In some embodiments, one or more components of the display block 185 are implemented as a PBP structure having a stack of PBP plates, which are described in greater detail below.

Half-Waveplates

A half-waveplate is a birefringent plane parallel plate, which is characterized by its thickness and optic-axis orientation. The thickness of a half-waveplate is $\lambda/(2\Delta n)$ for wavelength $\lambda$, where $\Delta n$ is the birefringence of the material. The azimuth angle corresponds to the extraordinary principal axis of the birefringent material at a certain point.

A half-waveplate introduces a half-wave relative phase difference between two eigenpolarizations. Consequently, a half-waveplate may rotate a linearly polarized incident light to another linearly polarized exiting light in a different orientation. For example, defining orientation angles in terms of a horizontal axis, if the azimuth angle of a PBP half-waveplate is oriented in a vertical direction (i.e., 90°), linearly polarized incident light having an orientation of 45° may be rotated to produce linearly polarized exiting light oriented at −45°. In another example, if the azimuth angle of the PBP half-waveplate is 22.5°, then the linearly polarized incident light having an orientation of 45° may be rotated to produce linearly polarized exiting light oriented at 0°.

In addition, a half-waveplate will flip the handedness of circularly polarized light of the wavelength associated with the half-waveplate, changing right circularly polarized light to left circularly polarized light, and vice versa. The absolute phase of the circularly polarized incident light is shifted depending on the azimuth angle of the half-waveplate.

PBP Plates

As discussed above, a PBP structure comprising one or more PBP plates may be located in an optics block of a HMD or other display device and used to direct or focus light projected by the display. In addition, it is understood that PBP structures described herein may also be implemented in other optical applications, not just within HMD systems. A PBP plate is a waveplate comprising liquid crystal molecules with spatially varying azimuth angles, and is characterized by its thickness and the spatial distribution of the azimuth angles. A PBP plate operates on an incident light beam based on the polarization of the beam, wherein the operation of the PBP plate depends on the spatial distribution of the azimuth angles. In some embodiments, a PBP plate may comprise a PBP liquid crystal lens or a PBP liquid crystal grating (also referred to as "PBP lens" and "PBP grating," respectively).

FIG. 2A is an example PBP liquid crystal lens 200, according to an embodiment. The PBP liquid crystal lens 200 creates a respective lens profile via an in-plane orientation of the liquid crystal molecule (defined by an azimuth angle θ), which creates an optical phase difference T defined as 2θ. In contrast, a conventional liquid crystal lens creates a lens profile via a birefringence (Δn) and layer thickness (d) of liquid crystals, and a number (#) of Fresnel zones (if it is Fresnel lens design), in which the phase difference T=Δnd*#*2π/λ. Accordingly, in some embodiments, a PBP liquid crystal lens 200 may have a large aperture size and can be made with a very thin liquid crystal layer, which allows fast switching speed to turn the lens power on/off.

Design specifications for HMDs used for VR, AR, or MR applications typically requires a large range of optical power to adapt for human eye vergence-accommodation (e.g., ~±2 Diopters or more), fast switching speeds (e.g., ~300 ms), and a good quality image. Note conventional liquid crystal lenses are not well suited to these applications as, a conventional liquid crystal lens generally would require the liquid crystal to have a relatively high index of refraction or be relatively thick (which reduces switching speeds). In contrast, a PBP liquid crystal lens is able to meet design specs using a liquid crystal having a relatively low index of refraction, is thin (e.g., a single liquid crystal layer can be ~2 μm), and has high switching speeds (e.g., 300 ms).

FIG. 2B is an example of liquid crystal orientations 210 in the PBP liquid crystal lens 200 of FIG. 2A, according to an embodiment. In the PBP liquid crystal lens 200, an azimuth angle (θ) of a liquid crystal molecule is continuously changed from a center 220 of the liquid crystal lens 200 to an edge 230 of the PBP liquid crystal lens 200, with a varied pitch Λ. The pitch Λ indicates a distance in which the azimuth angle of liquid crystal is rotated 180° from the initial state, and may be a function of the radius of the lens (r). For example, in some embodiments, the azimuth angle θ of the liquid crystals of the PBP LC lens 200 varies based upon distance from the center 220 (radius r), in accordance with the equation $$\theta(r) = \frac{\pi r^2}{2 f_0 \lambda_0},$$

where $f_0$ corresponds to the focal length of the PBP LC lens 200, and $\lambda_0$ corresponds to wavelength of incident light on the PBP LC lens 200.

FIG. 2C is a section of liquid crystal orientations 240 taken along a y axis in the PBP liquid crystal lens 200 of FIG. 2A, according to an embodiment. It is apparent from the liquid crystal orientation 240 that a rate of pitch variation is a function of distance from the lens center 220. The rate of pitch variation increases with distance from the lens center. For example, pitch at the lens center ($\Lambda_0$), is the slowest and pitch at the edge 220 ($\Lambda_r$) is the highest, i.e., $\Lambda_0 > \Lambda_1 > \ldots > \Lambda_r$. In the x-y plane, to make a PBP liquid crystal lens with lens radius (r) and lens power (+/−$f_0$), the azimuth angle needs to meet: $2\theta = r^2/f_0 * (\pi/\lambda_0)$, where $\lambda_0$ is the wavelength of incident light. Along with the z-axis, a dual twist or multiple twisted structure layers offers achromatic performance on efficiency in the PBP liquid crystal lens 200. Along with the z-axis, the non-twisted structure is simpler to fabricate then a twisted structure, but is configured for a monochromatic light.

Note that a PBP liquid crystal lens may have a twisted or non-twisted structure. In some embodiments, a stacked PBP liquid crystal lens structure may include one or more PBP liquid crystal lenses having a twisted structure, one or more PBP liquid crystal lenses having a non-twisted structure, or some combination thereof.

FIG. 3A is an example PBP liquid crystal grating 300, according to an embodiment. The PBP liquid crystal gratings 300 creates a respective grating profile via an in-plane orientation (θ, azimuth angle) of a liquid crystal molecule, in which the phase difference T=2θ.

FIG. 3B is an example of liquid crystal orientations 310 in the PBP liquid crystal grating 300 of FIG. 3A, according to an embodiment. In the PBP liquid crystal grating 300, an azimuth angle (θ) of a liquid crystal molecule is continuously changed along a particular axis (e.g., the y-axis), with a fixed pitch Λ. For example, as illustrated in FIG. 3B, the azimuth angle θ of the liquid crystal molecules in the PBP LC grating 300 varies along the y-axis (while being constant along the x-axis), characterized by the equation $$\theta(y) = \frac{\pi y}{\Lambda} = \pi \cdot y \cdot \sin\theta / \lambda_0,$$

where θ corresponds to the diffraction angle of the PBP LC grating 300, which is based upon the fixed pitch Λ of the PBP LC grating 300 (e.g., $\theta = \sin^{-1}(\lambda_0/\Lambda)$).

FIG. 3C is a section of liquid crystal orientations 340 taken along a y axis in the PBP liquid crystal grating 300 of FIG. 3A, according to an embodiment. It is apparent from the liquid crystal orientation 340 that a rate of pitch variation is fixed and it is not a function of distance from center of grating 320. For example, pitch at the lens center ($\Lambda_0$), is the same as pitch at the edges of the grating ($\Lambda_r$), i.e., $\Lambda_0 = \Lambda_1 = \ldots = \Lambda_r$.

In some embodiments, PBP liquid crystal lenses and PBP liquid crystal gratings may be active (also referred to as an active element) or passive (also referred to as a passive element). An active PBP liquid crystal lens has three optical states: an additive state, a neutral state, and a subtractive state. The additive state adds optical power to the system, the neutral state does not affect the optical power of the system (and does not affect the polarization of light passing through the active PBP liquid crystal), and the subtractive state subtracts optical power from the system. The state of an active PBP liquid crystal lens is determined by the handedness of polarization of light incident on the active PBP liquid crystal lens and an applied voltage.

For example, in some embodiments, an active PBP liquid crystal operates in a subtractive state responsive to incident light with a right handed circular polarization and an applied voltage of zero (or more generally below some minimal value), operates in an additive state responsive to incident light with a left handed circular polarization and the applied voltage of zero (or more generally below some minimal value), and operates in a neutral state (regardless of polarization) responsive to an applied voltage larger than a threshold voltage which aligns liquid crystal with positive dielectric anisotropy along with the electric field direction. If the active PBP liquid crystal lens is in the additive or subtractive state, light output from the active PBP liquid crystal lens has a handedness opposite that of the light input into the active PBP liquid crystal lens. In contrast, if the active PBP liquid crystal lens is in the neutral state, light output from the active PBP liquid crystal lens has the same handedness as the light input into the active PBP liquid crystal lens.

In contrast, a passive PBP liquid crystal lens has two optical states, specifically, an additive state and a subtractive state. The state of a passive PBP liquid crystal lens is determined by the handedness of polarization of light incident on the passive PBP liquid crystal lens. A passive PBP liquid crystal lens operates in a subtractive state responsive to incident light with a right handed polarization and operates in an additive state responsive to incident light with a left handed polarization. The passive PBP liquid crystal lens outputs light that has a handedness opposite that of the light input into the passive PBP liquid crystal lens.

An active PBP liquid crystal grating has three optical states (i.e., additive, subtractive, and neutral), similar to that of an active PBP liquid crystal lens. However, in an additive state, instead of adding optical power to the system, the additive state causes the active PBP liquid crystal grating to diffract light at a particular wavelength to a positive angle (+θ). Likewise, in the subtractive state, instead of subtracting optical power from the system, the subtractive state causes the active PBP liquid crystal grating to diffract light at the particular wavelength to a negative angle (−θ). On the other hand, the neutral state does not cause any diffraction of light (and does not affect the polarization of light passing through the active PBP liquid crystal grating). The state of an active PBP liquid crystal grating is determined by a handedness of polarization of light incident on the active PBP liquid crystal grating and an applied voltage. An active PBP liquid crystal grating operates in a subtractive state responsive to incident light with a right handed circular polarization and an applied voltage of zero (or more generally below some minimal value), operates in an additive state responsive to incident light with a left handed circular polarization and the applied voltage of zero (or more generally below some minimal value), and operates in a neutral state (regardless of polarization) responsive to an applied voltage larger than a threshold voltage which aligns liquid crystal with positive dielectric anisotropy along with the electric field direction. If the active PBP liquid crystal grating is in the additive or subtractive state, light output from the active PBP liquid crystal grating has a handedness opposite that of the light input into the active PBP liquid crystal grating. In contrast, if the active PBP liquid crystal grating is in the neutral state, light output from the active PBP liquid crystal grating has the same handedness as the light input into the active PBP liquid crystal grating.

A PBP plate may be implemented as a half-waveplate characterized by its thickness and the spatial distribution of it azimuth angles. For example, a PBP plate may be a half-waveplate having a thickness of $\lambda/(2\Delta n)$ for a wavelength $\lambda$, where $\Delta n$ is the birefringence of the material. As such, the half-wave PBP plate converts a left circularly polarized incident beam of the wavelength $\lambda$ into a right circularly polarized exiting beam with a spatially varying absolute phase. Depending on the spatial distribution of the azimuth angles, the absolute phase distribution of light exiting the PBP plate varies. The spatial phase distribution controls the far field distribution of the exiting beam.

In some embodiments, a PBP plate is a PBP grating whose diffraction operation depends on the incident polarization of an incident beam. As the incident beam passes through the plate, the left circularly polarized part of the beam becomes right circularly polarized and diffracts in one direction ($+1^{st}$ diffraction order), while the right circularly polarized part becomes left circularly polarized and diffracts in the other direction ($-1^{st}$ diffraction order). Since the PBP plate is designed for a particular wavelength of light (e.g., green light), light of other wavelengths (e.g., red and blue light) experience a less than half-wave or more than half-wave phase shift, causing leakage of the light of other wavelengths in the $0^{th}$ diffraction order.

In some embodiments, where the PBP plate is a geometric phase lens, a right circularly incident beam on the PBP lens becomes left circularly polarized, and converges to a focal plane, forming a real image in the exiting space ($\sim+1^{st}$ diffraction order). Similarly, a left circularly incident beam becomes right circularly polarized, diverges in the exiting space and forms a virtual focal plane in the incident space ($\sim-1^{st}$ diffraction order). Since the layer of PBP plate is designed for a particular wavelength of light (e.g., green light), wavelengths of light corresponding to other color channels (e.g., red and blue light) will experienced a less than half-wave or more than half-wave phase shift, causing leakage in the $0^{th}$ diffraction order.

Color Problem

Figure 4B:
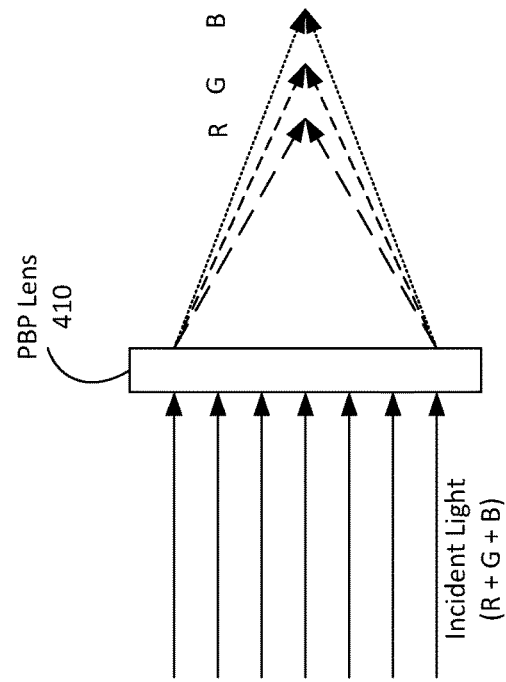
FIG. 4B illustrates color problems that may be present in PBP LC lens, in accordance with some embodiments.
Figure 4A:
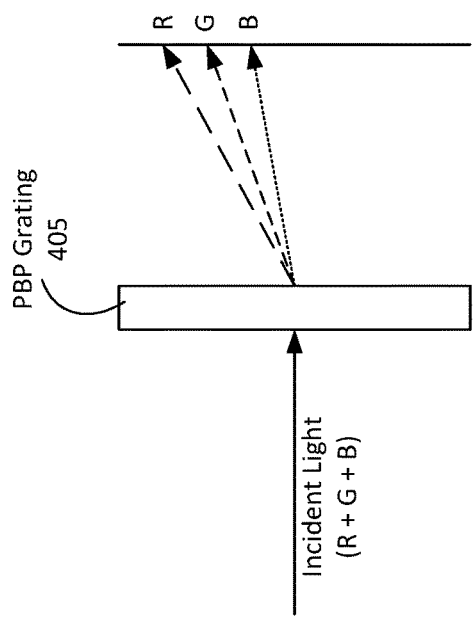
FIG. 4A illustrates color problems that may be present in PBP LC grating, in accordance with some embodiments.

FIG. 4A illustrates a PBP grating that steers light of different color channels at different angles, according to an embodiment. For example, the PBP grating 405 receives incident light comprising light of different color channels, each color channel associated with a different wavelength range. Each wavelength range may correspond to a different portion of a visible band of light (e.g., between 390 and 700 nm). For example, the color channels may comprise a red color channel (e.g., may correspond to a wavelength of approximately 630 nm), a green color channel (e.g., may correspond to a wavelength of approximately 525 nm), and a blue color channel (e.g., may correspond to a wavelength of approximately 490 nm). Because the angle at which the PBP grating 405 steers incident light is based upon the wavelength of the incident light, the light of the different color angles will be steered by different angles.

FIG. 4B illustrates a PBP lens that focuses light of different color channels to different focus points, according to an embodiment. For example, the PBP lens 410 receives incident light comprising light of different color channels, each color channel associated with a different wavelength range (e.g., red, green, and blue color channels). Because the focus distance of the PBP lens 410 changes based upon wavelength, the different color channels of incident light do not focus in the same focal plane.

The thickness of a PBP plate in order to function as half-waveplate is wavelength dependent. In addition, the effect of the periodicity or the distribution of the azimuth angles of the PBP plate is also wavelength dependent. As such, incident light of different wavelengths is steered or focused differently by the PBP plate, causing the incident light to blur or become unfocused.

Half and One-Waveplates

In some embodiments, to achieve achromatic performance, a PBP grating structure or lens structure (collectively referred to as a "PBP structure") is constructed using a plurality of PBP plates. Each PBP plate of the structure functions as a half-waveplate for a particular color channel or wavelength range, and as a one-waveplate for other color channels and wavelength ranges. For example, a PBP grating structure comprises multiple PBP gratings in order to steer light of multiple wavelengths (e.g., three wavelengths, red, green and blue) to the same angle. Similarly, a PBP lens structure may comprise multiple PBP lenses for steering light of multiple wavelengths to focus in the same focal plate.

In some embodiments, each of the multiple PBP plates of a PBP structure is associated with a different color channel. For example, in embodiments where the incident light on the PBP structure is divided into three color channels (e.g., red, green, and blue), three PBP plates are stacked to achieve apochromatism. Each of the three PBP plates is a half-waveplate for a respective wavelength, but a one-waveplate for the wavelengths corresponding to the remaining two PBP plates. Each of the respective wavelengths may correspond to a different color channel (e.g., red, green, and blue). A one-waveplate does not affect the polarization of the beam, and allows for incident light to pass through the waveplate unchanged.

For example, a particular PBP plate may have a thickness corresponding to a single layer half-waveplate for wavelength 525 nm. Assuming the birefringence Δn is constant through wavelength, the PBP plate functions as a half-waveplate for light of wavelength 525 nm, and as a one-waveplate for light of wavelength 262.5 nm. Therefore, for incident light having a wavelength of 525 nm, the exiting polarization of the light from the PBP half-waveplate has a spatially varying "absolute phase" when exiting the plate. On the other hand, for light having a wavelength of 262.5 nm, the exiting polarization stays the same as the incident polarization, without spatially varying phase change.

In some embodiments, in a PBP grating functioning as a half-waveplate for wavelength 525 nm (and a one-waveplate for 262.5 nm), the azimuth angles rotate 180 degrees over a spatial distance defined by the pitch Λ of the PBP grating. For wavelength 525 nm, the PBP grating diffracts in the directions following the grating equation ($\theta_m$=arcsin(mλ/Λ), where m is the diffraction order). On the other hand, wavelength 262.5 nm passes straight through the PBP plate without diffraction.

The far field of exiting beams from the PBP plate can be calculated through Fourier Transform. For example, for the 525 nm beam, the far field intensity distribution depends on the polarization of the incident beam. If the incident beam is perfectly unpolarized, exactly half of the exiting beam (right circularly polarized) diffracts to +1$^{st}$ diffraction direction, and the other half (left circularly polarized) diffracts to −1$^{st}$ diffraction direction. If the incident beam is right circularly polarized, light diffracts as left circularly polarized light to the 1$^{st}$ diffraction direction. On the other hand, because the PBP plate is a one-waveplate for the 262.5 nm beam, the beam passes through the PBP plate un-diffracted.

Apochromatic PBP Grating and Lens Structures

An apochromatic PBP structure (e.g., an apochromatic PBP grating structure or an apochromatic PBP lens structure) comprises a series of PBP plates coupled together, each associated with a different color channel. Each PBP plate is configured to function as a half-waveplate for a particular color channel, and a one-waveplate for the remaining color channels, and is configured to steer incident light of its respective color channel by a common angle or to focus incident light of its respective color channel to a common focus point. As such, incident light of multiple color channels can be steered or focused by the common angle or to the common focus point.

FIG. 5A illustrates a PBP grating structure 500 composed of a series of PBP gratings 520, 525, and 530, each configured to operate as a half waveplate for a respective color channel, while operating as a one waveplate (no change) for the other color channels. The PBP grating structure receives multi-chromatic incident light 535 comprising a red color channel, a green color channel, and a blue color channel. The incident light 535 propagates through the series of PBP gratings 520, 525, and 530, which steers the different color channels of the incident light 535 by a common angle θ to form output beams 540, 545, and 550.

For example, the red color channel is diffracted by the PBP grating 520 by the angle θ to form the output beam 540, while the green color channel is diffracted by the PBP grating 525 by the angle θ to form the output beam 545, and the blue color channel is diffracted by the PBP grating 530 to form the output beam 550. As such, each of the PBP gratings is configured such that light within their respective color channel is diffracted to the common angle θ, while having substantially no effect on the remaining color channels (e.g., the red color channel passes through the PBP gratings 525 and 530 substantially unaffected).

FIG. 5B illustrates a PBP lens structure 560 composed of a series of PBP liquid crystal lenses that are each configured to operate as a half waveplate for a respective color channel, and operate as a one waveplate for the remaining color channels. Each of the PBP lenses 580, 585, and 590 are configured such that light within their respective color channel is focused to a common point 598.

For example, incident light 595 may comprise a red color channel, green color channel, and blue color channel. The red color channel is focused by the PBP lens 580 towards the common focus point 598. The green color channel is focused by the PBP lens 585 towards the common focus point 598. The blue color channel is focused by the PBP lens 590 towards the common focus point 598.

Figure 6:
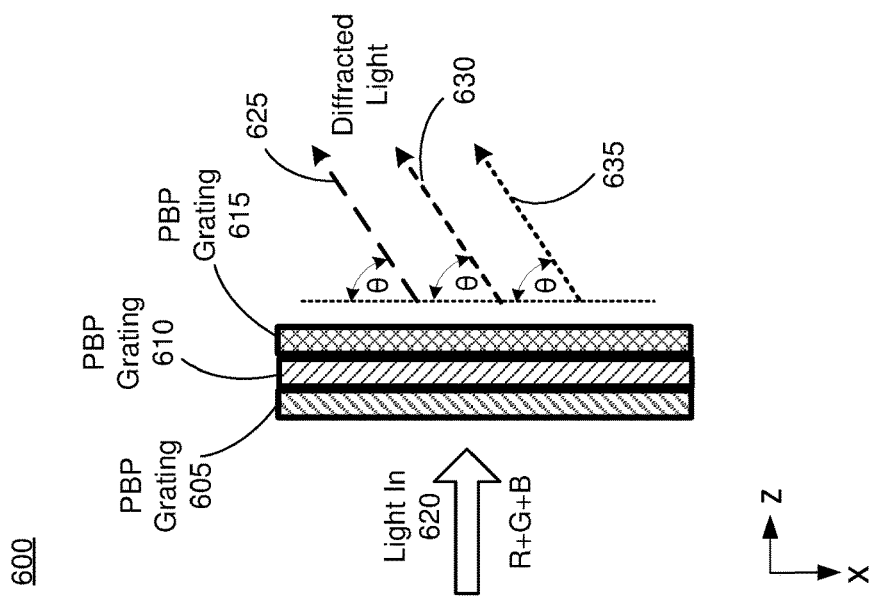
FIG. 6 illustrates another diagram of an apochromatic PBP LC grating structure, in accordance with some embodiments.

FIG. 6 illustrates a diagram of an apochromatic PBP grating structure 600, in accordance with some embodiments. As illustrated in FIG. 6, the PBP grating structure 600 comprises a first PBP grating 605, a second PBP grating 610, and a third PBP grating 615, each associated with a different color channel (e.g., red, green, and blue). Each of the PBP gratings is a half waveplate for one color corresponding to its respective color channel, but a one waveplate for the other two colors corresponding to the other color channels. As such, each of the PBP gratings 605, 610, and 615 operates as if the waveplate is enabled for one wavelength, but is disabled for other two wavelengths.

Each of the PBP gratings 605, 610, and 615 is configured to steer its respective color to a common angle θ. For a given pitch Λ, the angle θ at which incident light is steered is wavelength dependent. In order to steer all three colors to the same angle, the pitch of each of the PBP gratings will be different. For example, the angle θ at which incident light is steered can be expressed as a function of wavelength (λ) and pitch (Λ) as follows:

$$\sin\theta = \frac{\lambda}{\Lambda} = \frac{\lambda_{Red}}{\Lambda_{Red}} = \frac{\lambda_{Green}}{\Lambda_{Green}} = \frac{\lambda_{Blue}}{\Lambda_{Blue}} \quad (1)$$

Therefore, the pitch $\Lambda_{Red}$ of the red PBP grating 605 is longer than the pitch $\Lambda_{Green}$ of the green PBP grating 610, which is also longer than the pitch $\Lambda_{Blue}$ of the blue PBP grating 615, such that each of the gratings is able to steer incident light of its respective wavelength at the same angle θ. Based upon equation (1) above, the pitch in each grating should follow the equations:

$$\Lambda_{Red} = \Lambda_{Green} * \frac{\lambda_{Red}}{\lambda_{Green}} \quad (2)$$

$$\Lambda_{Green} = \frac{\lambda_{Green}}{\sin\theta} \quad (3)$$

$$\Lambda_{Blue} = \Lambda_{Green} * \frac{\lambda_{Blue}}{\lambda_{Green}} \quad (4)$$

Figure 7:
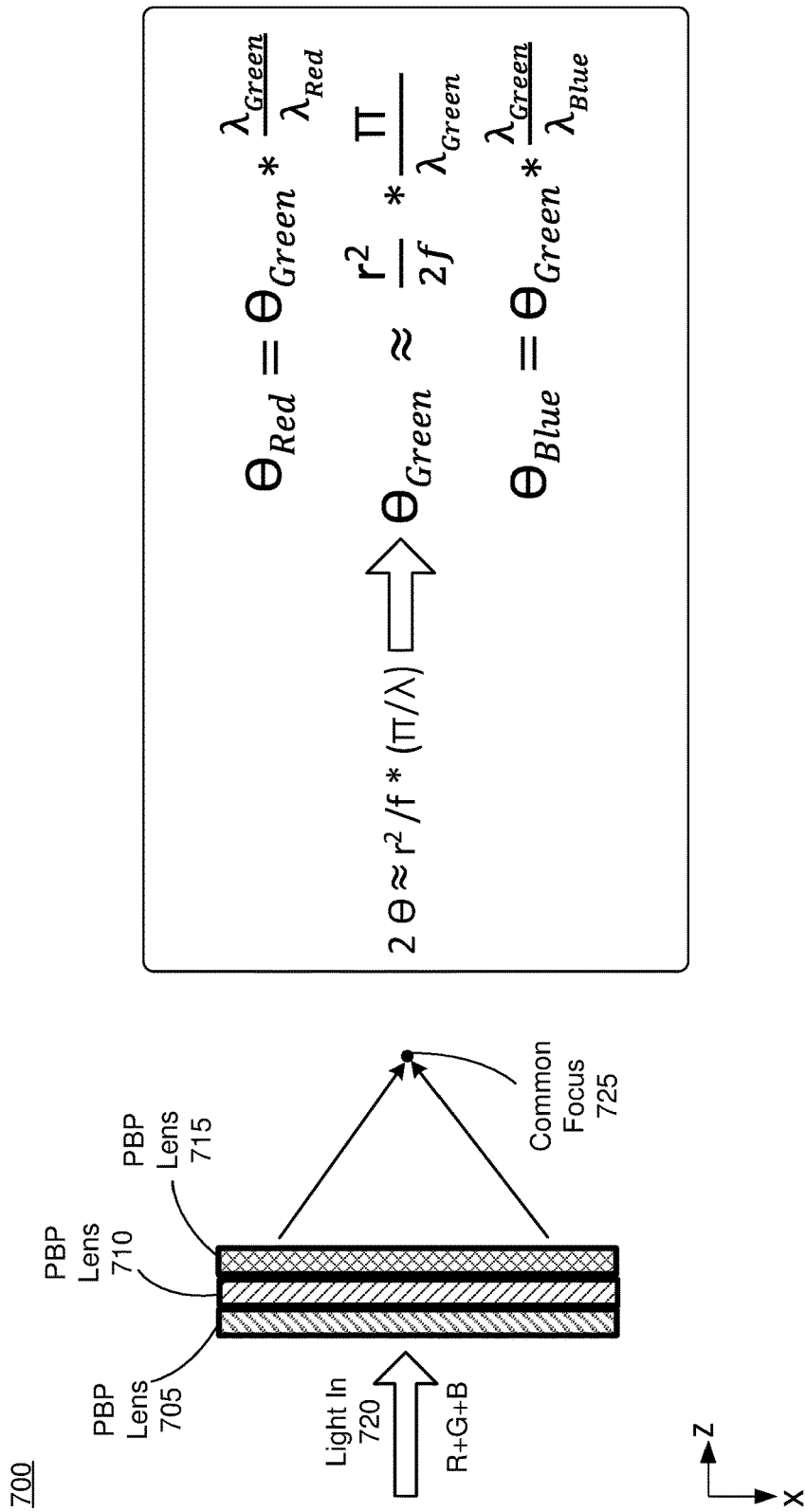
FIG. 7 illustrates another diagram of an apochromatic PBP LC lens structure, in accordance with some embodiments.

FIG. 7 illustrates another diagram of an apochromatic PBP lens 700, in accordance with some embodiments. As illustrated in FIG. 7, the PBP lens 700 comprises a first PBP lens 705, a second PBP lens 710, and a third PBP lens 715. Each of the PBP lens 705, 710, and 715 functions as a half waveplate for a particular color channel, but as a one waveplate for the remaining color channels. As such, each PBP lens focuses light of the input light 720 of the respective color channel to the common focus point 725, while being substantially transparent to the portion of the incident light 725 corresponding to the remaining color channels.

Each of the PBP LC lenses 705, 710, and 715 is configured to have a spatially varying LC orientation, wherein the phase or rotation speed of the azimuth angle θ is configured to focus light from the R, G, and B color channels to a common focus (f). In order to bring the focus to the same focus point, the phase/rotation speed of the azimuth angle $\theta_{red}$ of the red PBP lens 705 is slower than the phase/rotation speed of the azimuth angle $\theta_{green}$ of the green PBP lens 710, which is slower than the phase/rotation speed of the azimuth angle $\theta_{blue}$ of the blue PBP lens 715. For example, the focus f of each of the PBP lens 705, 710, and 715 may be characterized by:

$$f \approx \frac{\pi r^2}{2\theta \lambda} = \frac{\pi r^2}{2\theta_{Red}\lambda_{Red}} = \frac{\pi r^2}{2\theta_{Green}\lambda_{Green}} = \frac{\pi r^2}{2\theta_{Blue}\lambda_{Blue}} \quad (5)$$

Based upon equation (5) above, $\theta_{Red}\lambda_{Red}=\theta_{Green}\lambda_{Green}=\theta_{Blue}\lambda_{Blue}$. As such, the phase in each PBP lens should follow the following equations, where r indicates distance from a center of the PBP lens.

$$\theta_{Red} \approx \theta_{Green} * \frac{\lambda_{Red}}{\lambda_{Green}} \quad (6)$$

$$\theta_{Green} \approx \frac{r^2}{2f} * \frac{\pi}{\lambda_{Green}} \quad (7)$$

$$\theta_{Blue} \approx \theta_{Green} * \frac{\lambda_{Blue}}{\lambda_{Green}} \quad (8)$$

In one or more embodiments, a PBP grating structure or a PBP lens structure includes the following three PBP plates associated with a $1^{st}$ wavelength band, a $2^{nd}$ wavelength band, and a $3^{rd}$ wavelength band:

TABLE 1

| PBP Plate | 1st band | 2nd band | 3rd band |
|---|---|---|---|
| $1^{st}$ Plate | ½ wave | 1 wave | 1 wave |
| $2^{nd}$ Plate | 1 wave | ½ wave | 1 wave |
| $3^{rd}$ Plate | 1 wave | 1 wave | ½ wave |

In some embodiments, the $1^{st}$, $2^{nd}$, and $3^{rd}$ wavelength bands correspond to red, green, and blue color channels, respectively. The red color channel may correspond to a wavelength of $\lambda_R=0.630$ µm, while the green color channel corresponds to a wavelength of $\lambda_G=0.525$ µm, and the blue color channel corresponds to a wavelength of $\lambda_B=0.490$ am.

In some embodiments, it may be difficult to configure a PBP plate to have a thickness t and material birefringence Δn to provide the exact target retardance for all three wavelengths corresponding to the three bands shown above in Table 1. Instead, thicknesses for each of the PBP plates of the PBP structure may be designed to achieve as close to the target retardance as possible. The pitches and azimuth angles of each plate follows the grating equations (Equations (2)-(4) above) or lens equations (Equations (6)-(8) above) for the specific color channel wavelengths.

As discussed above, a PBP plate having a thickness t=λ/(2Δn) functions as a half-waveplate for light of the wavelength λ. As such, the retardance (birefringence in waves) for a waveplate with thickness t can be characterized as $$\delta[\text{wave}] = \frac{\lambda}{\Delta n t}.$$

Because retardance cycles through every 360 degrees or every one wave, a one-waveplate, two-waveplate, and three-waveplate (which may be referred to as $0^{th}$ order, $1^{st}$ order, and $2^{nd}$ order one-waveplate, respectively) produce the same net one-wave of retardance. Similarly, a half-waveplate, one-and-a-half-waveplate, and two-and-a-half-waveplate (also referred to as $0^{th}$ order, $1^{st}$ order, and $2^{nd}$ order half-waveplate, respectively) all produce a net half-wave of retardance. Therefore, the modulo of the resultant retardance is considered in the calculation for determining waveplate thickness, providing a certain degree of freedom in the waveplate design. This modulo of retardance can be compared to the net ideal retardance as Δδ[waves]=Modulo (δ, 1)−ideal δ.

In some embodiments, where the "ideal δ" is for the one-wave, the modulo is compared to 0 if it is less than 0.5, otherwise the modulo is compared with 1 if it is larger than 0.5. Similarly, the modulo may be compared to 0.5 for half-wave retardance. The thickness of a PBP plate can found by minimizing a merit function that is the root-mean-square (rms) of the Δδ[waves] for the wavelengths corresponding to each of the color channels.

Another degree of freedom of this design is the birefringence Δn of the material may vary as function of wavelength. For example, in some embodiments, for a particular PBP plate material, the birefringence for red light may be $\Delta n_R=0.2-R$, $0.001<R<0.025$, while the birefringence for green light is $\Delta n_G=0.2$, and the birefringence of blue light is $\Delta n_B=0.2+B$, $0.001<B<0.025$, where R and B correspond to constant values based upon a difference in wavelength between green light and red and blue light, respectively. In some embodiments, R and B correspond to parameters inherent to a type of material used to construct the PBP plates corresponding to the red and blue color channels.

Tables 2, 3, and 4 below illustrate possible designs for PBP plates of a PBP structure configured to receive light from red, green, and blue color channels corresponding to the wavelengths described above. The PBP structure comprises a first PBP plate functioning as a red half-waveplate, a second PBP plate functioning as a green half-waveplate, and a third PBP plate functioning as a blue half-waveplate. Table 2 shows five possible designs for the first PBP plate functioning as the red half-waveplate (which also functions as a green one-waveplate and a blue one-waveplate), Table 3 shows four possible designs for the second PBP plate functioning as the green half-waveplate (which also functions as a red one-waveplate and a blue one-waveplate), and Table 4 shows four possible designs for the third PBP plate functioning the blue half-waveplate (which also functions as a red one-waveplate and a green one-waveplate).

TABLE 2

| t µm | R | B | # $\lambda_R$ | # $\lambda_G$ | # $\lambda_B$ | Merit |
|---|---|---|---|---|---|---|
| 5.05 | 0.013 | 0.001 | 1.499 | 1.924 | 2.072 | 0.0603 |
| 5.03 | 0.010 | 0.001 | 1.517 | 1.916 | 2.063 | 0.0614 |
| 5.04 | 0.012 | 0.002 | 1.501 | 1.916 | 2.074 | 0.0644 |
| 5.06 | 0.017 | 0.002 | 1.470 | 1.928 | 2.086 | 0.0672 |
| 5.00 | 0.007 | 0.002 | 1.532 | 1.905 | 2.061 | 0.0679 |

TABLE 3

| t µm | R | B | # $\lambda_R$ | # $\lambda_G$ | # $\lambda_B$ | Merit |
|---|---|---|---|---|---|---|
| 6.56 | 0.008 | 0.024 | 1.999 | 2.499 | 2.999 | 0.00096 |
| 6.57 | 0.009 | 0.024 | 1.992 | 2.503 | 3.003 | 0.0054 |
| 14.42 | 0.025 | 0.004 | 4.006 | 5.493 | 6.003 | 0.0054 |
| 6.73 | 0.016 | 0.016 | 1.966 | 2.564 | 2.967 | 0.0461 |

TABLE 4

| t µm | R | B | # $\lambda_R$ | # $\lambda_G$ | # $\lambda_B$ | Merit |
|---|---|---|---|---|---|---|
| 10.50 | 0.02 | 0.01 | 3 | 4 | 4.5 | 0 |
| 13.13 | 0.008 | 0.005 | 4.002 | 5.002 | 5.493 | 0.004 |
| 10.49 | 0.019 | 0.01 | 3.014 | 3.996 | 4.496 | 0.009 |
| 10.48 | 0.02 | 0.011 | 2.994 | 3.992 | 4.513 | 0.009 |

As discussed above, the distribution of azimuth angles for each plate is wavelength specific. For example, for a PBP lens, the azimuth angle is in-plane and oriented as $\theta = r^2/f^* (\pi/\lambda)/2$, where r is the radial distance from the center of the lens, and f is the focal length. For a PBP grating, the pitch $\Lambda$ indicating revolution of the azimuth determines the steering angle $\theta = \arcsin(\lambda/\Lambda)$.

Multifocal or Varifocal PBP

In embodiments where a PBP plate is made by active liquid crystal with a uniform (non-patterned) conductive layer or liquid crystal monomers, a multifocal image system can be achieved by stacking multiple PBP plates with electrically switchable half-waveplate in between or in front.

In a case where PBP plate is made by active liquid crystal with fine pattern conductive layer, it is possible to use this stack of PBP plates to achieve varying steering angle (in time) for a beam steering PBP plate or varying focal length (in time) for a PBP lens by actively tuning the azimuth angle orientation of each plate.

System Environment

Figure 8:
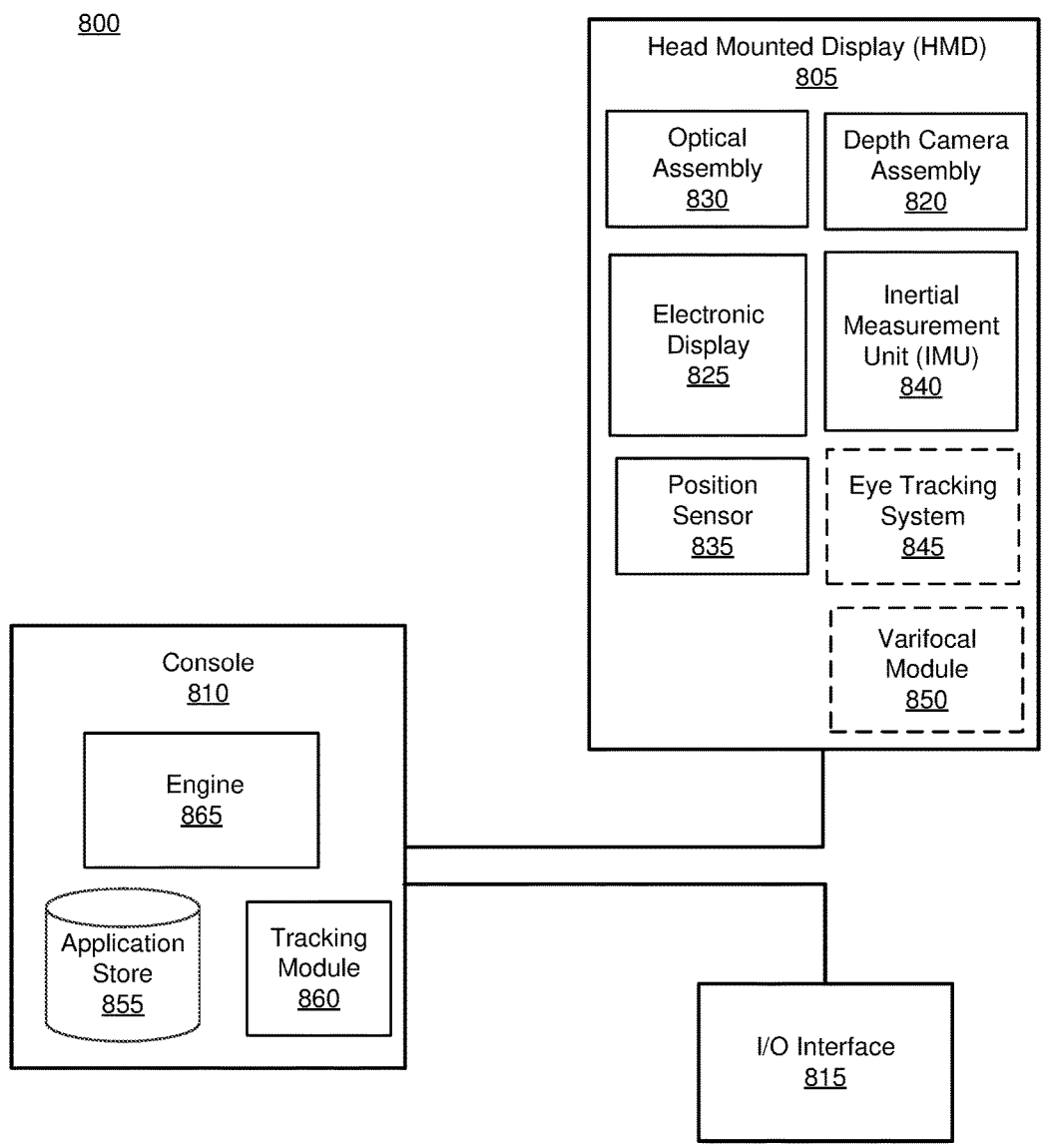
FIG. 8 is a block diagram of one embodiment of a HMD system in which a console operates.

FIG. 8 is a block diagram of one embodiment of a HMD system 800 in which a console 810 operates. The HMD system 800 may operate in an artificial reality environment. The HMD system 800 shown by FIG. 8 comprises a HMD 805 and an input/output (I/O) interface 815 that is coupled to the console 810. While FIG. 8 shows an example HMD system 800 including one HMD 805 and on I/O interface 815, in other embodiments any number of these components may be included in the HMD system 800. For example, there may be multiple HMDs 805 each having an associated I/O interface 815, with each HMD 805 and I/O interface 815 communicating with the console 810. In alternative configurations, different and/or additional components may be included in the HMD system 800. Additionally, functionality described in conjunction with one or more of the components shown in FIG. 8 may be distributed among the components in a different manner than described in conjunction with FIG. 8 in some embodiments. For example, some or all of the functionality of the console 810 is provided by the HMD 805.

The HMD 805 is a head-mounted display that presents content to a user comprising virtual and/or augmented views of a physical, real-world environment with computer-generated elements (e.g., two-dimensional (2D) or three-dimensional (3D) images, 2D or 3D video, sound, etc.). In some embodiments, the presented content includes audio that is presented via an external device (e.g., speakers and/or headphones) that receives audio information from the HMD 805, the console 810, or both, and presents audio data based on the audio information. The HMD 805 may comprise one or more rigid bodies, which may be rigidly or non-rigidly coupled together. A rigid coupling between rigid bodies causes the coupled rigid bodies to act as a single rigid entity. In contrast, a non-rigid coupling between rigid bodies allows the rigid bodies to move relative to each other. An embodiment of the HMD 805 is the HMD 100 described above in conjunction with FIG. 1A.

The HMD 805 includes a DCA 820, an electronic display 825, an optical assembly 830, one or more position sensors 835, an IMU 840, an optional eye tracking system 845, and an optional varifocal module 850. Some embodiments of the HMD 805 have different components than those described in conjunction with FIG. 8. Additionally, the functionality provided by various components described in conjunction with FIG. 8 may be differently distributed among the components of the HMD 805 in other embodiments.

The DCA 820 captures data describing depth information of a local area surrounding some or all of the HMD 805. The DCA 820 can compute the depth information using the data (e.g., based on a captured portion of a structured light pattern), or the DCA 820 can send this information to another device such as the console 810 that can determine the depth information using the data from the DCA 820.

The electronic display 825 displays two-dimensional or three-dimensional images to the user in accordance with data received from the console 810. In various embodiments, the electronic display 825 comprises a single electronic display or multiple electronic displays (e.g., a display for each eye of a user). Examples of the electronic display 825 include: a liquid crystal display (LCD), an organic light emitting diode (OLED) display, an inorganic light emitting diode (ILED) display, an active-matrix organic light-emitting diode (AMOLED) display, a transparent organic light emitting diode (TOLED) display, some other display, or some combination thereof. In some embodiments, the electronic display 825 may represent the electronic display 155 in FIG. 1B.

The optical assembly 830 magnifies image light received from the electronic display 825, corrects optical errors associated with the image light, and presents the corrected image light to a user of the HMD 805. In some embodiments, the optical assembly 830 corresponds to the optical block 160 illustrated in FIG. 1B or the display block 185 illustrated in FIG. 1D. The optical assembly 830 includes a plurality of optical elements, including an apochromatic PBP structure (e.g., a PBP lens structure and/or a PBP grating structure) in accordance with the embodiments described above, configured to adjust incident light from the electronic display 825 by a predetermined angle or to focus the light from the electronic display to a predetermined point. In some embodiments, the optical assembly 830 may further comprises other optical elements, such as: an aperture, a Fresnel lens, a convex lens, a concave lens, a filter, a reflecting surface, or any other suitable optical element that affects image light. Moreover, the optical assembly 830 may include combinations of different optical elements. In some embodiments, one or more of the optical elements in the optical assembly 830 may have one or more coatings, such as partially reflective or anti-reflective coatings.

Magnification and focusing of the image light by the optical assembly 830 allows the electronic display 825 to be physically smaller, weigh less and consume less power than larger displays. Additionally, magnification may increase the field-of-view of the content presented by the electronic display 825. For example, the field-of-view of the displayed content is such that the displayed content is presented using almost all (e.g., approximately 110 degrees diagonal), and in some cases all, of the user's field-of-view. Additionally in some embodiments, the amount of magnification may be adjusted by adding or removing optical elements.

In some embodiments, the optical assembly 830 may be designed to correct one or more types of optical error. Examples of optical error include barrel or pincushion distortions, longitudinal chromatic aberrations, or transverse chromatic aberrations. Other types of optical errors may further include spherical aberrations, chromatic aberrations or errors due to the lens field curvature, astigmatisms, or any other type of optical error. In some embodiments, content provided to the electronic display 825 for display is pre-distorted, and the optical assembly 830 corrects the distortion when it receives image light from the electronic display 825 generated based on the content. In some embodiments, the optical assembly 830 comprises a pancake lens assembly and an absorptive linear polarizer to mitigate the *Narcissus* effect without affecting image brightness. In some embodiments, the optical assembly 830 further comprises a waveplate, such as a PBP structure (e.g., a PBP grating structure or a PBP lens structure as described above). In some embodiments, the optical assembly 830 may represent the optical block 160 illustrated in FIG. 1B or the display block 185 illustrated in FIG. 1D.

The IMU 840 is an electronic device that generates data indicating a position of the HMD 805 based on measurement signals received from one or more of the position sensors 835 and from depth information received from the DCA 820. A position sensor 835 generates one or more measurement signals in response to motion of the HMD 805. Examples of position sensors 835 include: one or more accelerometers, one or more gyroscopes, one or more magnetometers, another suitable type of sensor that detects motion, a type of sensor used for error correction of the IMU 840, or some combination thereof. The position sensors 835 may be located external to the IMU 840, internal to the IMU 840, or some combination thereof.

Based on the one or more measurement signals from one or more position sensors 835, the IMU 840 generates data indicating an estimated current position of the HMD 805 relative to an initial position of the HMD 805. For example, the position sensors 835 include multiple accelerometers to measure translational motion (forward/back, up/down, left/right) and multiple gyroscopes to measure rotational motion (e.g., pitch, yaw, roll). In some embodiments, the position sensors 835 may represent the position sensors 140 in FIG. 1A. In some embodiments, the IMU 840 rapidly samples the measurement signals and calculates the estimated current position of the HMD 805 from the sampled data. For example, the IMU 840 integrates the measurement signals received from the accelerometers over time to estimate a velocity vector and integrates the velocity vector over time to determine an estimated current position of a reference point on the HMD 805. Alternatively, the IMU 840 provides the sampled measurement signals to the console 810, which interprets the data to reduce error. The reference point is a point that may be used to describe the position of the HMD 805. The reference point may generally be defined as a point in space or a position related to the HMD's 805 orientation and position.

The IMU 840 receives one or more parameters from the console 810. The one or more parameters are used to maintain tracking of the HMD 805. Based on a received parameter, the IMU 840 may adjust one or more IMU parameters (e.g., sample rate). In some embodiments, certain parameters cause the IMU 840 to update an initial position of the reference point so it corresponds to a next position of the reference point. Updating the initial position of the reference point as the next calibrated position of the reference point helps reduce accumulated error associated with the current position estimated the IMU 840. The accumulated error, also referred to as drift error, causes the estimated position of the reference point to "drift" away from the actual position of the reference point over time. In some embodiments of the HMD 805, the IMU 840 may be a dedicated hardware component. In other embodiments, the IMU 840 may be a software component implemented in one or more processors. In some embodiments, the IMU 840 may represent the IMU 130 in FIG. 1A.

In some embodiments, the eye tracking system 845 is integrated into the HMD 805. The eye tracking system 845 determines eye tracking information associated with an eye of a user wearing the HMD 805. The eye tracking information determined by the eye tracking system 845 may comprise information about an orientation of the user's eye, i.e., information about an angle of an eye-gaze. In some embodiments, the eye tracking system 845 is integrated into the optical assembly 830. An embodiment of the eye-tracking system 845 may comprise an illumination source and an imaging device (camera).

In some embodiments, the varifocal module 850 is further integrated into the HMD 805. The varifocal module 850 may be coupled to the eye tracking system 845 to obtain eye tracking information determined by the eye tracking system 845. The varifocal module 850 may be configured to adjust focus of one or more images displayed on the electronic display 825, based on the determined eye tracking information obtained from the eye tracking system 845. In this way, the varifocal module 850 can mitigate vergence-accommodation conflict in relation to image light. The varifocal module 850 can be interfaced (e.g., either mechanically or electrically) with at least one of the electronic display 825 and at least one optical element of the optical assembly 830. Then, the varifocal module 850 may be configured to adjust focus of the one or more images displayed on the electronic display 825 by adjusting position of at least one of the electronic display 825 and the at least one optical element of the optical assembly 830, based on the determined eye tracking information obtained from the eye tracking system 845. By adjusting the position, the varifocal module 850 varies focus of image light output from the electronic display 825 towards the user's eye. The varifocal module 850 may be also configured to adjust resolution of the images displayed on the electronic display 825 by performing foveated rendering of the displayed images, based at least in part on the determined eye tracking information obtained from the eye tracking system 845. In this case, the varifocal module 850 provides appropriate image signals to the electronic display 825. The varifocal module 850 provides image signals with a maximum pixel density for the electronic display 825 only in a foveal region of the user's eye-gaze, while providing image signals with lower pixel densities in other regions of the electronic display 825. In one embodiment, the varifocal module 850 may utilize the depth information obtained by the DCA 820 to, e.g., generate content for presentation on the electronic display 825.

The I/O interface 815 is a device that allows a user to send action requests and receive responses from the console 810. An action request is a request to perform a particular action. For example, an action request may be an instruction to start or end capture of image or video data or an instruction to perform a particular action within an application. The I/O interface 815 may include one or more input devices. Example input devices include: a keyboard, a mouse, a game controller, or any other suitable device for receiving action requests and communicating the action requests to the console 810. An action request received by the I/O interface 815 is communicated to the console 810, which performs an action corresponding to the action request. In some embodiments, the I/O interface 815 includes an IMU 840 that captures calibration data indicating an estimated position of the I/O interface 815 relative to an initial position of the I/O interface 815. In some embodiments, the I/O interface 815 may provide haptic feedback to the user in accordance with instructions received from the console 810. For example, haptic feedback is provided when an action request is received, or the console 810 communicates instructions to the I/O interface 815 causing the I/O interface 815 to generate haptic feedback when the console 810 performs an action.

The console 810 provides content to the HMD 805 for processing in accordance with information received from one or more of: the DCA 820, the HMD 805, and the I/O interface 815. In the example shown in FIG. 8, the console 810 includes an application store 855, a tracking module 860, and an engine 865. Some embodiments of the console 810 have different modules or components than those described in conjunction with FIG. 8. Similarly, the functions further described below may be distributed among components of the console 810 in a different manner than described in conjunction with FIG. 8.

The application store 855 stores one or more applications for execution by the console 810. An application is a group of instructions, that when executed by a processor, generates content for presentation to the user. Content generated by an application may be in response to inputs received from the user via movement of the HMD 805 or the I/O interface 815. Examples of applications include: gaming applications, conferencing applications, video playback applications, or other suitable applications.

The tracking module 860 calibrates the HMD system 800 using one or more calibration parameters and may adjust one or more calibration parameters to reduce error in determination of the position of the HMD 805 or of the I/O interface 815. For example, the tracking module 860 communicates a calibration parameter to the DCA 820 to adjust the focus of the DCA 820 to more accurately determine positions of structured light elements captured by the DCA 820. Calibration performed by the tracking module 860 also accounts for information received from the IMU 840 in the HMD 805 and/or an IMU 840 included in the I/O interface 815. Additionally, if tracking of the HMD 805 is lost (e.g., the DCA 820 loses line of sight of at least a threshold number of structured light elements), the tracking module 860 may re-calibrate some or all of the HMD system 800.

The tracking module 860 tracks movements of the HMD 805 or of the I/O interface 815 using information from the DCA 820, the one or more position sensors 835, the IMU 840 or some combination thereof. For example, the tracking module 850 determines a position of a reference point of the HMD 805 in a mapping of a local area based on information from the HMD 805. The tracking module 860 may also determine positions of the reference point of the HMD 805 or a reference point of the I/O interface 815 using data indicating a position of the HMD 805 from the IMU 840 or using data indicating a position of the I/O interface 815 from an IMU 840 included in the I/O interface 815, respectively. Additionally, in some embodiments, the tracking module 860 may use portions of data indicating a position or the HMD 805 from the IMU 840 as well as representations of the local area from the DCA 820 to predict a future location of the HMD 805. The tracking module 860 provides the estimated or predicted future position of the HMD 805 or the I/O interface 815 to the engine 855.

The engine 865 generates a 3D mapping of the area surrounding some or all of the HMD 805 (i.e., the "local area") based on information received from the HMD 805. In some embodiments, the engine 865 determines depth information for the 3D mapping of the local area based on information received from the DCA 820 that is relevant for techniques used in computing depth. The engine 865 may calculate depth information using one or more techniques in computing depth from structured light. In various embodiments, the engine 865 uses the depth information to, e.g., update a model of the local area, and generate content based in part on the updated model.

The engine 865 also executes applications within the HMD system 800 and receives position information, acceleration information, velocity information, predicted future positions, or some combination thereof, of the HMD 805 from the tracking module 860. Based on the received information, the engine 865 determines content to provide to the HMD 805 for presentation to the user. For example, if the received information indicates that the user has looked to the left, the engine 865 generates content for the HMD 805 that mirrors the user's movement in a virtual environment or in an environment augmenting the local area with additional content. Additionally, the engine 865 performs an action within an application executing on the console 810 in response to an action request received from the I/O interface 815 and provides feedback to the user that the action was performed. The provided feedback may be visual or audible feedback via the HMD 805 or haptic feedback via the I/O interface 815.

In some embodiments, based on the eye tracking information (e.g., orientation of the user's eye) received from the eye tracking system 845, the engine 865 determines resolution of the content provided to the HMD 805 for presentation to the user on the electronic display 825. The engine 865 provides the content to the HMD 805 having a maximum pixel resolution on the electronic display 825 in a foveal region of the user's gaze, whereas the engine 865 provides a lower pixel resolution in other regions of the electronic display 825, thus achieving less power consumption at the HMD 805 and saving computing cycles of the console 810 without compromising a visual experience of the user. In some embodiments, the engine 865 can further use the eye tracking information to adjust where objects are displayed on the electronic display 825 to prevent vergence-accommodation conflict.

Additional Configuration Information

The foregoing description of the embodiments has been presented for the purpose of illustration; it is not intended to be exhaustive or to limit the patent rights to the precise forms disclosed. Persons skilled in the relevant art can appreciate that many modifications and variations are possible in light of the above disclosure.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the disclosure may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments of the disclosure may also relate to a product that is produced by a computing process described herein. Such a product may comprise information resulting from a computing process, where the information is stored on a non-transitory, tangible computer readable storage medium and may include any embodiment of a computer program product or other data combination described herein.

The language used in the specification has been principally selected for readability and instructional purposes, and it may not have been selected to delineate or circumscribe the inventive subject matter. It is therefore intended that the scope of the patent rights be limited not by this detailed description, but rather by any claims that issue on an application based hereon. Accordingly, the disclosure of the embodiments is intended to be illustrative, but not limiting, of the scope of the patent rights, which is set forth in the following claims.

What is claimed is:

1. A Pancharatnam Berry Phase (PBP) liquid crystal structure comprising:
   a first PBP active element configured to act as half waveplate for light of a first wavelength range corresponding to a first color channel of a set of color channels, such that light of the first wavelength range is adjusted by a first amount, and to act as a one waveplate for at least light of a second wavelength range corresponding to a second color channel of the set of color channels, such that light of the second wavelength range is able to pass through the first PBP active element without substantially changing direction; and
   a second PBP active element configured to act as a half waveplate for light of the second wavelength range, such that light of the second wavelength range is adjusted by the first amount, and to act as a one waveplate for a least light of the first wavelength range, such that light of the first wavelength range is able to pass through the second PBP active element without substantially changing direction.

2. The PBP liquid crystal structure of claim 1, wherein the first PBP active element is a first PBP liquid crystal grating that is configured to adjust light of the first wavelength range to a first angle, and the second PBP active element is a second PBP liquid crystal grating that is configured to adjust light of the second wavelength range to the first angle.

3. The PBP liquid crystal structure of claim 2, wherein the first PBP liquid crystal grating has a first pitch, and the second PBP liquid crystal grating has a second pitch that is different than the first pitch.

4. The PBP liquid crystal structure of claim 3, wherein the first pitch is directly proportional to a wavelength within the first range of wavelengths, and inversely proportional to a sine of the first angle.

5. The PBP liquid crystal structure of claim 4, wherein the second pitch is directly proportional to a wavelength within the second range of wavelengths, and inversely proportional to a sine of the first angle.

6. The PBP liquid crystal structure of claim 1, wherein the first PBP active element is a first PBP liquid crystal lens that is configured to focus light of the first wavelength range to a first location, and the second PBP active element is a second PBP liquid crystal lens that is configured to focus light of the second wavelength range to the first location.

7. The PBP liquid crystal structure of claim 6, wherein the first PBP liquid crystal lens has a first liquid crystal rotation speed, and the second PBP liquid crystal lens has a second liquid crystal rotation speed that is different than the first liquid crystal rotation speed.

8. The PBP liquid crystal structure of claim 6, wherein the first liquid crystal rotation speed is directly proportional to a first radial distance of the first PBP liquid crystal lens, and inversely proportional to a distance to the first location and a wavelength in the first range of wavelengths.

9. The PBP liquid crystal structure of claim 8, wherein the second liquid crystal rotation speed is directly proportional to a second radial distance of the second PBP liquid crystal lens, and inversely proportional to a distance to the first location and a wavelength in the second range of wavelengths.

10. The PBP liquid crystal structure of claim 1, wherein the first PBP active element and the second PBP active element are stacked to form a stacked structure, the stacked structure configured to receive a light comprising at least light of the first wavelength range and light of the second wavelength range, the light passing through the second active element prior to passing through the first active element.

11. The PBP liquid crystal structure of claim 1, wherein the first PBP active element and the second PBP active element are part of an optical assembly of a head-mounted display (HMD).

12. The PBP liquid crystal structure of claim 1, wherein the first range of wavelengths is a portion of a visible band of light comprising wavelengths between 390 nm and 700 nm, and the second range of wavelengths is a different portion of the visible band of light.

13. A head-mounted display (HMD), comprising:
   an electronic display configured to emit image light that is inclusive of a set of color channels;
   an optical assembly configured to optically correct for chromatic aberration for the set of color channels using a Pancharatnam Berry Phase (PBP) liquid crystal structure that outputs image light corrected for chromatic aberration for the set of color channels in accordance with color correction instructions, the PBP liquid crystal structure comprising:
      a first PBP active element configured to act as half waveplate for light of a first wavelength range corresponding to a first color channel of the set of color channels, such that light of the first wavelength range is adjusted by a first amount, and to act as a one waveplate for at least light of a second wavelength range corresponding to a second color channel of the set of color channels, such that light of the second wavelength range is able to pass through the first PBP active element without substantially changing direction; and a second PBP active element configured to act as a half waveplate for light of the second wavelength range, such that light of the second wavelength range is adjusted by the first amount, and to act as a one waveplate for a least light of the first wavelength range, such that light of the first wavelength range is able to pass through the second PBP active element without substantially changing direction.

14. The HMD of claim 13, wherein the first PBP active element is a first PBP liquid crystal grating that is configured to adjust light of the first wavelength range to a first angle, and the second PBP active element is a second PBP liquid crystal grating that is configured to adjust light of the second wavelength range to the first angle.

15. The HMD of claim 14, wherein the first PBP liquid crystal grating has a first pitch, and the second PBP liquid crystal grating has a second pitch that is different than the first pitch.

16. The HMD of claim 15, wherein the first pitch is directly proportional to a wavelength within the first range of wavelengths, and inversely proportional to a sine of the first angle.

17. The HMD of claim 13, wherein the first PBP active element is a first PBP liquid crystal lens that is configured to focus light of the first wavelength range to a first location, and the second PBP active element is a second PBP liquid crystal lens that is configured to focus light of the second wavelength range to the first location.

18. The HMD of claim 17, wherein the first PBP liquid crystal lens has a first liquid crystal rotation speed, and the second PBP liquid crystal lens has a second liquid crystal rotation speed that is different than the first liquid crystal rotation speed.

19. The HMD of claim 18, wherein the first liquid crystal rotation speed is directly proportional to a first radial distance of the first PBP liquid crystal lens, and inversely proportional to a distance to the first location and a wavelength in the first range of wavelengths.

20. The HMD of claim 13, wherein the first range of wavelengths is a portion of a visible band of light, and the second range of wavelengths is a different portion of the visible band of light.

* * * * *